Feb. 12, 1963  B. P. KANG  3,077,514
POWER CABLES
Filed March 10, 1958

INVENTOR.
Bun P. Kang
BY
ATTORNEYS

United States Patent Office 3,077,514
Patented Feb. 12, 1963

3,077,514
POWER CABLES
Bun P. Kang, Hastings on Hudson, N.Y., assignor to Anaconda Wire and Cable Company, a corporation of Delaware
Filed Mar. 10, 1958, Ser. No. 720,427
4 Claims. (Cl. 174—120)

This invention relates to power cable and is particularly directed to the provision of a power cable in which the conductor is insulated with many superposed wrappings of dielectric tape formed of a solid synthetic polymeric material, the tape being specially formed to permit easy penetration of a dielectric fluid between successive turns of the wrapping.

For many years power cables have been manufactured with the conductor or conductors of the cable covered by a layer of helically wrapped paper tape impregnated with a hydrocarbon oil. In such cables, the oil must be thoroughly impregnated into the paper wrapping. In some cables for high voltage use, oil is continuously forced under pressure through longitudinal channels in the finished cable structure. Sometimes a dry inert gas is introduced under pressure into the cable structure to maintain the oil under pressure.

In all of these various forms of cable, a strip of tape or paper, usually of kraft paper, is helically wrapped about the conductors to form the porous solid insulating body. Despite the advantages which paper possesses as a convenient and inexpensive form of oil-permeable material with which to form the solid dielectric of an oil-impregnated power cable, its use limits the maximum working voltage of such cable for a given thickness of insulation.

It is the purpose of the present invention to provide an improved oil-impregnated power cable capable of being operated at higher voltages than conventional oil-paper insulated power cables without correspondingly increasing the thickness of the insulation and hence the bulk of the cable. To achieve this purpose the solid dielectric component of the cables according to the invention is made of wrappings of specially formed tapes of the solid synthetic polymeric material, preferably selected from the group consisting of the polyalkylenes (for example, polyethylene, polypropylene, polybutylene, polystyrene, and polytetrafluoroethylene) and the polycarbonates.

Both the polyalkylenes and polycarbonates in sheet or film form are quite impervious to fluid, and tapes of such material are likely to trap tiny bubbles of air between successive layers when they are wrapped about the conductor. It is virtually impossible for the cable oil to penetrate between successive wrappings of such tapes, and hence any trapped air bubbles remain focal points for potential ionization and consequent electrical failure. To overcome this difficulty, the invention contemplates forming the solid dielectric component of the cable by wrapping about the conductor a tape formed of substantially impervious sheets of these polymers (polyalkylenes and polycarbonates) having at least one side formed with a multiplicity of oil-permeable channels extending thereacross from edge to edge. These channels permit easy penetration of the cable oil between successive layers of the wrapping, and hence make possible effective impregnation of the cable insulation structure by the liquid dielectric.

Since the dielectric constant of the particular polyalkylenes employed in accordance with this invention are generally much closer in value to the dielectric constants of the cable oils generally used than are the dielectric constants of papers, the resultant impregnated insulation in which the polyalkylenes are employed is considerably more electrically homogeneous than oil-impregnated paper. Hence electrical stresses in the new cable are much more uniformly distributed through the insulating medium than has been the case with power cables as heretofore manufactured.

One convenient way in which to provide the oil-permeable channels is to form a multiplicity of closely spaced grooves extending completely across the tape from edge to edge in at least one side thereof. Another way is to laminate the impervious tape of solid polymeric material (polyalkylenes or polycarbonates) to a thin porous layer of finely divided particles of the same polymer, such as laminating a polyethylene tape to a porous layer of matted polyethylene fibers or a porous layer of sintered polyethylene powder. In either case, such porous layer extends the full width of the tape, from edge to edge thereof, and provides oil-permeable channels through which the cable oil can penetrate between successive layers of the tape wrappings about the conductor.

Preferred embodiments of the invention are described hereinbelow with reference to the accompanying drawings, wherein FIG. 1 is a perspective view of a single-conductor cable in which the conductor is covered by a layer of impregnated insulation according to the present invention;

Figure 1:
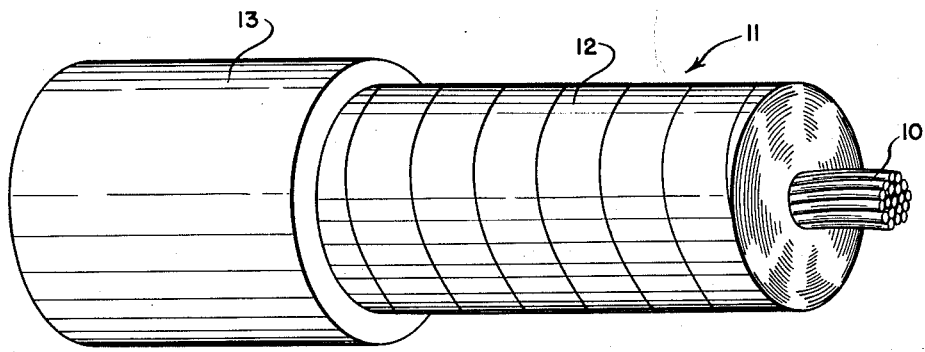

Referring to FIG. 1, a solid type single-conductor lead-sheathed cable is shown insulated in accordance with the invention. The cable includes a conductor 10 composed of a plurality of stranded metallic wires and surrounded throughout substantially its entire length by an insulating covering 11. The covering 11 is formed of a considerable number of layers of a dielectric tape 12 applied preferably with each turn of the tape substantially abutting, or with its edge spaced slightly from the adjoining edge of the adjacent turn, rather than with overlapping of the adjoining turns (some overlapping may, however, be unavoidable). The dielectric tape 12 is of thin sheet polyethylene having at least one side formed with oil-permeable channels extending completely across its width. These channels permit the helical wrapping 11 to be impregnated with a dielectric fluid (such as a hydrocarbon oil), thus filling all voids which otherwise would exist between successive layers of the tape, by saturating the covered conductor in a bath of the fluid in the conventional manner. A close-fitting extruded lead or other metal sheath 13 is applied about the entire length of the oil-impregnated cable.

The polyethylene of which the tape 12 is formed preferably is so-called linear or "isotactic" polyethylene. Isotactic polymers are those formed under conditions which result in a sterospecific polymerization of the monomer molecule. Such polymers possess a higher degree of crystallinity and a higher melting point than randomly polymerized compounds having the same molecular weight but a disordered structure. Polyethylene theoretically possesses no side chains and should display no variation in properties due to steric variations; but in fact the main chains of polyethylene molecules often possess polyethylene side chains. The presence of such branched chains decreases the hardness and melting point of the polymer. As applied to polyethylene, therefore, the term "isotactic" is synonymous with "linear" and denotes the substantial absence of branched chain molecules, as a result of which a maximum melting point, hardness, degree of crystallinity, and other properties due to ordered arrangement of the polymer molecules can be attained in a mass made up of polymer molecules of given molecular weight. These properties are advantageous because it is desirable to subject the cable prior to impregnation to a temperature as near as possible to 100° C. to drive off moisture, and because in the completed cable the insulation must be able to withstand operation at quite high temperature (up to about 85° C.) and must be resistant to creep and to deformation under pressure. Such properties generally are found in polyethylene which has been slowly cooled or annealed from the melt condition when formed, rather than cooled rapidly, to allow longitudinal orientation of the polyethylene molecules. The polyethylene as originally formed, or the sheets, tapes, fibers, or powders produced therefrom, may be exposed to high voltage bombardment by electrons or other radiations effective to cross-link its molecules and thus improve further its resistance to cold flow and to attack by the impregnating oil.

The polyethylene employed preferably has a molecular weight of approximately 25,000, a melting point of about 110° C. or higher, and a dielectric constant of approximately 2.5 (as compared to a dielectric constant for most kraft paper of about 3.8). Because of the low water-absorbtive properties of such polyethylene, the electrical properties of this material are not particularly sensitive to humidity.

Figure 2:
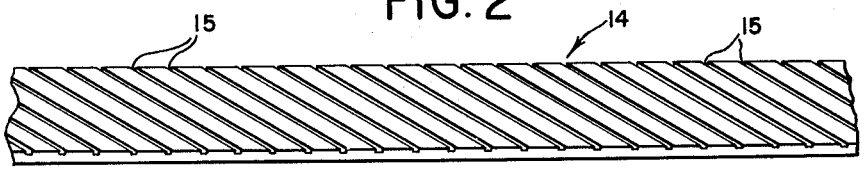
FIG. 2 is a perspective view of a length of solid polyethylene tape having transverse grooves formed in one surface thereof.

In FIG. 2 one preferred embodiment of tape of the character contemplated by the invention is illustrated. It is a thin narrow tape 14 cut from a sheet of impervious solid polyethylene and has a multiplicity of parallel grooves 15 extending diagonally from edge to edge across one side. The grooves 15 may be of virtually any cross-section but are shown as being rectangular, and their depth advantageously is approximately one-third the thickness of the tape 14. They are preferably formed at the same angle to the side edges of the tape as the angle of lay of the tape when it is helically wrapped about the conductor, so that the channels in the cable insulation will extend longitudinally of the cable. They may be formed in any convenient manner, such as by cutting them into an originally ungrooved polyethylene sheet, or by impressing them during fabrication of the sheet. Preferably the latter course is taken and the grooves 15 are formed as the polyethylene sheet is rolled in the conventional manner from a heated drum by corresponding parallel helical ridges on the surface of the drum. A permanent negative impression of the ridges is thereby impressed into one surface of the sheet. It is also possible, of course, to imprint the grooves 15 on a smooth polyethylene sheet in an operation subsequent to formation of the sheet, by rolling the smooth sheet through a pair of heated rollers, one of which has such parallel ridges thereon. By this latter method, it is possible to adapt commercially available smooth sheets of polyethylene to this embodiment of the invention.

Figure 4:
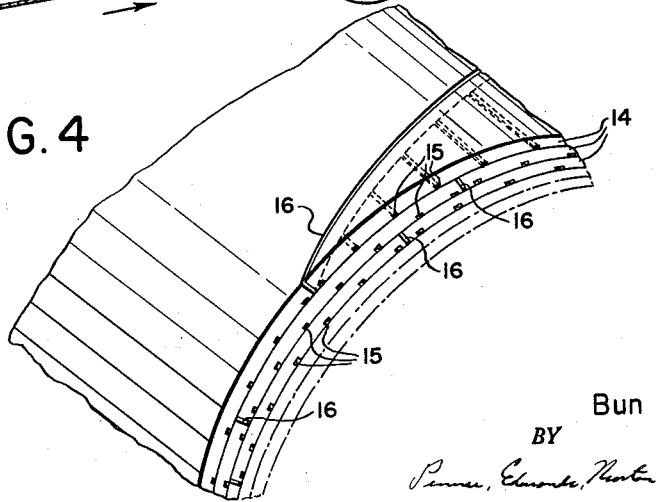
FIG. 4 is a perspective view on a greatly enlarged scale of a body of conductor insulation formed of helical wrappings of tapes of the character shown in FIG. 2.

A number of layers of the tape 14 illustrated in FIG. 2 are helically wrapped about a conductor to form an insulating covering thereon of the character shown in FIG. 4. The grooves 15 define a multiplicity of small oil-permeable channels longitudinally disposed in the tape wrappings, into and through which the oil impregnant may easily penetrate. Slight fissures 16 always exist between the abutting turns, either because they are intentionally provided or because it is not practical to lay the tapes with such accuracy that they are not formed, and these fissures, in cooperation with the channels, permit the impregnating oil to penetrate from layer to layer through the entire body of polyethylene insulation. Since the distance between adjacent grooves 15 is small, a film of the impregnating oil also penetrates between the face-to-face surfaces of adjoining turns of tape so that all voids originally present become filled with oil. As a result, after the helical wrapping is thoroughly impregnated, the insulation surrounding the conductor is a mass of solid polyethylene and impregnating oil which is substantially completely free of voids.

Figure 3:
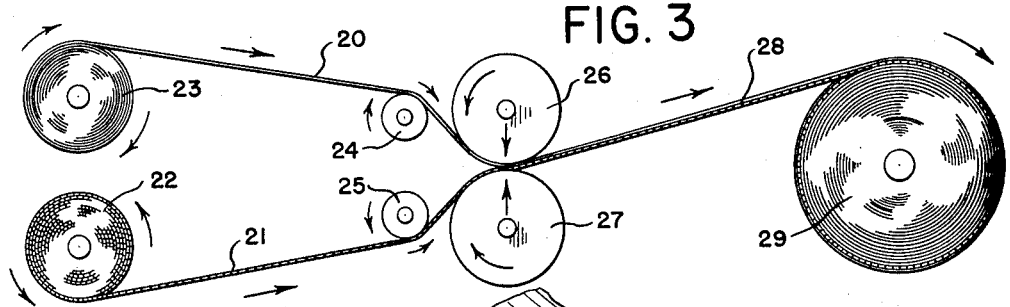
FIG. 3 is a schematic view illustrating the manufacture of a roll of tape comprising laminated layers of solid and porous polyethylene materials.

In FIG. 3 another advantageous embodiment of tape for use in forming cable according to this invention is schematically illustrated. In this embodiment, the tape is of laminated construction and is formed by bonding together two separate tapes 20 and 21 shown issuing from corresponding supply rolls 22 and 23. The tape 21 is a thin narrow strip cut from a porous sheet of coherent particles of polyethylene. Such a sheet may be a matted paper-like structure of polyethylene fibers, or it may be a sintered mass of polyethylene powder, but in either case it is characterized by having a multitude of minute interconnected channels by which oil may permeate completely through it from edge to edge.

The tape 20 is of conventional impervious polyethylene in sheet or film form. It is drawn from the roll 23 over a guide roller 24 and converges with the porous tape 21, which is drawn over a corresponding guide roller 25, between a pair of rollers 26 and 27. Sufficient pressure and heat are applied by these latter rollers to bond the two tapes 20 and 21 into a composite laminated tape 28 without seriously impairing the permeability of the porous component 21. The composite tape is wound into a roll 29. If desired, relatively wide sheets of such porous and impervious polyethylene components may be laminated together and then cut into tape-width strips after lamination.

The tape 28 is wrapped about a conductor in successive layers, preferably with adjacent turns of the wrapping substantially abutting or spaced slightly apart, as described above, to form a solid insulating covering about the conductor. This covering is composed of alternate layers of porous and impervious polyethylene, with narrow fissures between the adjacent turns of tape. When the helical wrapping of the tape 28 is impregnated with a cable oil, the oil permeates from layer to layer by way of the fissures between the adjoining turns and spreads longitudinally of the cable between successive layers through the permeable component of the tape. All voids and fissures are thereby completely filled with the impregnating oil, and uniformly high dielectric strength is thereby imparted to the conductor insulation. It is of course necessary that the porous fibrous or sintered component 21 of the tape 28 be free from any totally enclosed cells or pores which cannot be permeated by the oil during the impregnation operation, for any such voids would be focal points for breakdown of the insulation under high voltage stress.

Although particular reference has been made herein to the use of polyethylene as the material forming the tapes wrapped about the conductor, these tapes may be formed of other equivalent polymers instead. Solid polymers of the addition type, including polybutylene, polypropylene, polystyrene, and polytetrafluoroethylene or of the condensation type, such as the polycarbonates, are representative equivalents that may be used in place of polyethylene in making cables according to this invention. Preferably, these materials are used in the form of isotactic polymers in the case of polybutylene, polypropylene, and polystyrene, since the isotactic forms of these polymers exhibit a high degree of crystallinity and hence a higher melting point than the "atactic" or disordered modifications.

The particular cable design in which the above-described conductor insulation is embodied of course forms no part of this invention. Although a single-conductor cable has been illustrated, it may equally well be a cable having three, or any other desired number, conductors. It generally will include one or more electrostatic shield tape wrappings, and it may include other cable elements not shown or described herein. And it may be an oil-filled, gas-filled, or gas-pressure type of power cable in-

I claim:
1. An electric power cable comprising at least one conductor surrounded by a helical wrapping of dielectric tape and having a dielectric liquid substantially impregnating said wrapping, in said dielectric tape is a thin substantially impervious sheet of a solid isotactic polymeric material of the group consisting of polyethylene, polypropylene, polybutylene, polystyrene, polytetrafluoroethylene, and polycarbonates bonded to a thin porous layer of finely divided particles of solid polymeric material selected from said group, said porous layer extending the full width of said tape, said wrapping having slight helical fissures existing therein between adjacent turns of the tape interconnecting successive layers of said porous layer and thereby permitting easy penetration of the dielectric liquid throughout the wrapping.

2. A cable according to claim 1, in which the impervious sheet and the porous layer bonded thereto are both composed of the same polymeric material.

3. An electric power cable comprising at least one conductor surrounded by a helical wrapping of dielectric tape and having a dielectric liquid substantially impregnating said wrapping, in which said dielectric tape is a thin substantially impervious sheet of a solid isotactic polymeric material of the group consisting of polyethylene, polypropylene, polybutylene, polystyrene, polytetrafluoroethylene, and polycarbonates bonded to a thin porous layer of matted fibers of solid polymeric material selected from said group, said matted layer extending the full width of said tape, said wrapping having slight helical fissures existing therein between adjacent turns of the tape interconnecting successive layers of said matted layer and thereby permitting easy penetration of the dielectric liquid throughout the wrapping.

4. A cable according to claim 3, in which the impervious sheet and the porous layer bonded thereto are both composed of the same polymeric material.

References Cited in the file of this patent

UNITED STATES PATENTS

| | | |
|---|---|---|
| 1,730,740 | Morrison | Oct. 8, 1929 |
| 2,196,026 | Piercy | Apr. 2, 1940 |
| 2,309,992 | Scott et al. | Feb. 2, 1943 |
| 2,314,694 | Dodds | Mar. 23, 1943 |
| 2,432,568 | Cambitta | Dec. 16, 1947 |
| 2,454,625 | Bondon | Nov. 23, 1948 |
| 2,591,794 | Ebel | Apr. 8, 1952 |

FOREIGN PATENTS

| | | |
|---|---|---|
| 439,345 | Great Britain | Dec. 4, 1935 |
| 576,411 | Great Britain | Apr. 2, 1946 |
| 579,018 | Great Britain | July 19, 1946 |
| 727,130 | Great Britain | Mar. 30, 1955 |
| 538,782 | Belgium | Dec. 6, 1955 |
| 553,596 | Italy | Dec. 28, 1956 |
| 773,563 | Great Britain | Apr. 24, 1957 |

OTHER REFERENCES

Felten et al.: German application 1,020,075 printed November 28, 1957 (Kl. 21c 7/52).